UNITED STATES PATENT OFFICE.

ALBERT WELLER, OF FRANKFORT-ON-THE-MAIN, GERMANY, ASSIGNOR TO VEREINIGTE CHININFABRIKEN ZIMMER & CO., GESELLSCHAFT MIT BESCHRÄNKTER HAFTUNG, OF SAME PLACE.

SALICYLATES OF THE YTTRIUM GROUP.

SPECIFICATION forming part of Letters Patent No. 643,280, dated February 13, 1900.

Application filed July 19, 1898. Serial No. 686,367. (No specimens.)

*To all whom it may concern:*

Be it known that I, ALBERT WELLER, a subject of the Emperor of Germany, and a resident of Frankfort-on-the-Main, Germany, have invented certain new and useful Improvements in Antiseptic Compounds, of which the following is a specification.

Although free salicylic acid is an efficient antiseptic it cannot be applied to surgical purposes, owing to its corrosive action, and the hitherto known salts of salicylic acid have not been capable of application to surgical purposes, either because they are devoid of antiseptic properties or on account of the poisonous properties of the metal with which the salicylic acid is combined.

I have succeeded in preparing salts of salicylic acid which, while presenting the strikingly antiseptic character of salicylic acid, do not possess the aforesaid disadvantages.

The salts prepared according to this invention are the hitherto unknown compounds of salicylic acid with the rare earths, particularly didymium and lanthanum earths of the yttrium group. These salts are widely applicable in surgery, especially as dry antiseptics, being distinguished from the compounds of this class which have been hitherto used, in that they contain no poisonous material, no iodine, and no heavy metals and the like.

Antiseptic action to such a degree is not possessed either by the separate constituents of the salts in question or by other salts of the rare earths.

Didymium or lanthanum salicylate or a mixture of both salts is best prepared by adding the equivalent quantity of a salicylate (for example, sodium salicylate) to a solution of known strength of a soluble salt of the said earth or earths and then filtering and washing the precipitate. The compounds can be also prepared by direct action of salicylic acid on the hydrate or carbonate of the said earth or earths.

Didymium salicylate is a pale pink powder insoluble in water. The constitution is $Di_2(C_6H_4(OH)COO)_6$.

I claim—

1. The hereinbefore-described antiseptic powder consisting of a salicylate of a metal of the yttrium group, substantially as described.

2. The herein-described didymium salicylate obtained from the double-earth didymium in the form of a pale pink powder possessing excellent antiseptic properties, being non-poisonous, insoluble in water and having the formula $Di_2(C_6H_4(OH)COO)_6$.

In testimony whereof I have signed my name to this specification in the presence of two subscribing witnesses.

ALBERT WELLER.

Witnesses:
 FRANZ HASSLACHER,
 WILHELM EITEL.